US012720335B2

(12) United States Patent
Liu et al.

(10) Patent No.: US 12,720,335 B2
(45) Date of Patent: Aug. 25, 2026

(54) TIME SENSITIVE NETWORKING PARAMETER UNAVAILABILITY INDICATION

(71) Applicant: QUALCOMM Incorporated, San Diego, CA (US)

(72) Inventors: Huichun Liu, San Diego, CA (US); Sebastian Speicher, Wallisellen (CH); Lenaig Genevieve Chaponniere, La Jolla, CA (US); Suli Zhao, San Diego, CA (US); Erin Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/575,121

(22) PCT Filed: Aug. 6, 2021

(86) PCT No.: PCT/CN2021/111168

§ 371 (c)(1),
(2) Date: Dec. 28, 2023

(87) PCT Pub. No.: WO2023/010523

PCT Pub. Date: Feb. 9, 2023

(65) Prior Publication Data

US 2024/0349083 A1 Oct. 17, 2024

(51) Int. Cl.

| | |
|---|---|
| ***H04W 28/02*** | (2009.01) |
| ***H04W 24/02*** | (2009.01) |
| ***H04W 72/08*** | (2009.01) |

(52) U.S. Cl.

CPC .................................. *H04W 24/02* (2013.01)

(58) Field of Classification Search

None

See application file for complete search history.

(56) References Cited

U.S. PATENT DOCUMENTS

| | | | | |
|---|---|---|---|---|
| 12,160,327 | B2 * | 12/2024 | Ke | H04W 76/12 |
| 12,262,294 | B2 * | 3/2025 | Fernandez Alonso | H04W 4/50 |

(Continued)

FOREIGN PATENT DOCUMENTS

| | | | |
|---|---|---|---|
| WO | WO-2021001051 | A1 | 1/2021 |
| WO | WO-2021067913 | A1 | 4/2021 |
| WO | WO-2021097637 | A1 | 5/2021 |

OTHER PUBLICATIONS

3rd Generation Partnership Project, Technical Specification Group Core Network and Terminals, 5G System (5GS), Network to TSN translator (TT) Protocol Aspects, Stage 3 (Release 17), 3GPP TS 24.539 V17.1.0, Jun. 2021, pp. 1-92, Sections 5,6, 9.4.

International Search Report and Written Opinion—PCT/CN2021/111168—ISA/EPO—Apr. 26, 2022.

(Continued)

*Primary Examiner* — Sithu Ko

(74) *Attorney, Agent, or Firm* — Harrity & Harrity, LLP

(57) ABSTRACT

Various aspects of the present disclosure generally relate to wireless communication. In some aspects, a wireless communication device may receive, from a time-sensitive networking (TSN) application function (AF), a first request for a parameter at a device-side TSN translator (DS-TT) associated with the wireless communication device. The wireless communication device may generate a cause code that indicates that the parameter is supported but not available, if the parameter is not available. The wireless communication device may transmit the cause code to the TSN-AF. Numerous other aspects are described.

30 Claims, 11 Drawing Sheets

(56) References Cited

U.S. PATENT DOCUMENTS

| | | | | |
|---|---|---|---|---|
| 12,414,062 | B2 * | 9/2025 | Larsson | H04W 56/0045 |
| 12,425,267 | B2 * | 9/2025 | Luetzenkirchen | H04L 12/4625 |
| 12,543,071 | B2 * | 2/2026 | Huang | H04L 47/28 |
| 2014/0237153 | A1 | 8/2014 | Glaser et al. | |
| 2020/0059989 | A1 | 2/2020 | Velev et al. | |
| 2021/0212069 | A1 * | 7/2021 | Moon | H04W 28/24 |
| 2021/0243771 | A1 * | 8/2021 | Mannweiler | H04W 24/02 |
| 2021/0368331 | A1 * | 11/2021 | Ke | H04W 28/0215 |
| 2022/0124559 | A1 * | 4/2022 | Ke | H04W 28/10 |
| 2022/0182896 | A1 * | 6/2022 | Talebi Fard | H04W 36/0085 |
| 2022/0217794 | A1 * | 7/2022 | Miklós | H04W 76/15 |
| 2022/0256393 | A1 * | 8/2022 | Zhang | H04W 28/24 |
| 2023/0075078 | A1 * | 3/2023 | Qiang | H04W 72/0446 |
| 2023/0180207 | A1 * | 6/2023 | Rossbach | H04W 72/535<br>370/329 |

OTHER PUBLICATIONS

"3rd Generation Partnership Project, Technical Specification Group Core Network and Terminals, 5G System (5GS), Network to TSN translator (TT) protocol aspects, Stage 3 (Release 17)", 3GPP Standard, Technical Specification, 3GPP TS 24.539, 3rd Generation Partnership Project, Mobile Competence Centre, 650, Route Des Lucioles, F-06921, Sophia-Antipolis Cedex, France, No. V17.1.0, Jul. 1, 2021, 92 Pages, XP052029958, p. 10-p. 19, p. 37-p. 58.

Lee Cosart Microsemi: "Draft Amendment 1 to G.8275.2, WD8275.2Amd1LD", ITU-T Draft, Study Period 2017-2020, Study Group 15, Series WD8275.2AMD1LD, International Telecommunication Union, Geneva, CH, vol. 13/15, Mar. 24, 2017, 26 Pages, XP044196656, p. 13-p. 16.

Supplementary European Search Report—EP21952398—Search Authority—Munich—Mar. 18, 2025.

* cited by examiner

TIME SENSITIVE NETWORKING PARAMETER UNAVAILABILITY INDICATION

CROSS-REFERENCE TO RELATED APPLICATION

This Patent Application is a 371 national stage of PCT Application No. PCT/CN2021/111168 filed on Aug. 6, 2021, entitled "TIME SENSITIVE NETWORKING PARAMETER UNAVAILABILITY INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating that a time sensitive networking parameter is supported but unavailable.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g. bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MTMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include receiving, from a time-sensitive networking (TSN) application function (AF), a first request for a parameter at a device-side TSN translator (DS-TT) associated with the wireless communication device. The method may include generating a cause code that indicates that the parameter is supported but not available, if the parameter is not available. The method may include transmitting the cause code to the TSN-AF.

Some aspects described herein relate to a method of wireless communication performed by a network device. The method may include receiving, from a TSN-AF, a first request for a parameter at a network-side TSN translator (NW-TT) associated with the network device. The method may include generating a cause code that indicates that the parameter is supported but not available, if the parameter is not available. The method may include transmitting the cause code to the TSN-AF.

Some aspects described herein relate to a method of wireless communication performed by a network device. The method may include transmitting, to a DS-TT or a NW-TT, a first request for a parameter. The method may include receiving a cause code that indicates that the parameter is supported but not available.

Some aspects described herein relate to a wireless communication device for wireless communication. The wireless communication device may include a memory and one or more processors coupled to the memory. The one or more processors may be configured to receive, from a TSN-AF, a first request for a parameter at a DS-TT associated with the wireless communication device. The one or more processors may be configured to generate a cause code that indicates that the parameter is supported but not available, if the parameter is not available. The one or more processors may be configured to transmit the cause code to the TSN-AF.

Some aspects described herein relate to a network device for wireless communication. The network device may include a memory and one or more processors coupled to the memory. The one or more processors may be configured to receive, from a TSN-AF, a first request for a parameter at an NW-TT associated with the network device. The one or more processors may be configured to generate a cause code that indicates that the parameter is supported but not available, if the parameter is not available. The one or more processors may be configured to transmit the cause code to the TSN-AF.

Some aspects described herein relate to a network device for wireless communication. The network device may include a memory and one or more processors coupled to the memory. The one or more processors may be configured to transmit, to a DS-TT or a NW-TT, a first request for a parameter. The one or more processors may be configured to receive a cause code that indicates that the parameter is supported but not available.

Some aspects described herein relate to a non-transitory computer-readable medium that stores a set of instructions for wireless communication by a wireless communication device. The set of instructions, when executed by one or more processors of the wireless communication device, may cause the wireless communication device to receive, from a TSN-AF, a first request for a parameter at a DS-TT associated with the wireless communication device. The set of instructions, when executed by one or more processors of the wireless communication device, may cause the wireless communication device to generate a cause code that indicates that the parameter is supported but not available, if the parameter is not available. The set of instructions, when executed by one or more processors of the wireless communication device, may cause the wireless communication device to transmit the cause code to the TSN-AF.

Some aspects described herein relate to a non-transitory computer-readable medium that stores a set of instructions for wireless communication by a network device. The set of instructions, when executed by one or more processors of the network device, may cause the network device to receive, from a TSN-AF, a first request for a parameter at an NW-TT associated with the network device. The set of instructions, when executed by one or more processors of the network device, may cause the network device to generate a cause code that indicates that the parameter is supported but not available, if the parameter is not available. The set of instructions, when executed by one or more processors of the network device, may cause the network device to transmit the cause code to the TSN-AF.

Some aspects described herein relate to a non-transitory computer-readable medium that stores a set of instructions for wireless communication by a network device. The set of instructions, when executed by one or more processors of the network device, may cause the network device to transmit, to a DS-TT or a NW-TT, a first request for a parameter. The set of instructions, when executed by one or more processors of the network device, may cause the network device to receive a cause code that indicates that the parameter is supported but not available.

Some aspects described herein relate to an apparatus for wireless communication. The apparatus may include means for receiving, from a TSN-AF, a first request for a parameter at a DS-TT associated with the apparatus. The apparatus may include means for generating a cause code that indicates that the parameter is supported but not available, if the parameter is not available. The apparatus may include means for transmitting the cause code to the TSN-AF.

Some aspects described herein relate to an apparatus for wireless communication. The apparatus may include means for receiving, from a TSN-AF, a first request for a parameter at an NW-TT associated with the apparatus. The apparatus may include means for generating a cause code that indicates that the parameter is supported but not available, if the parameter is not available. The apparatus may include means for transmitting the cause code to the TSN-AF.

Some aspects described herein relate to an apparatus for wireless communication. The apparatus may include means for transmitting, to a DS-TT or a NW-TT, a first request for a parameter. The apparatus may include means for receiving a cause code that indicates that the parameter is supported but not available.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
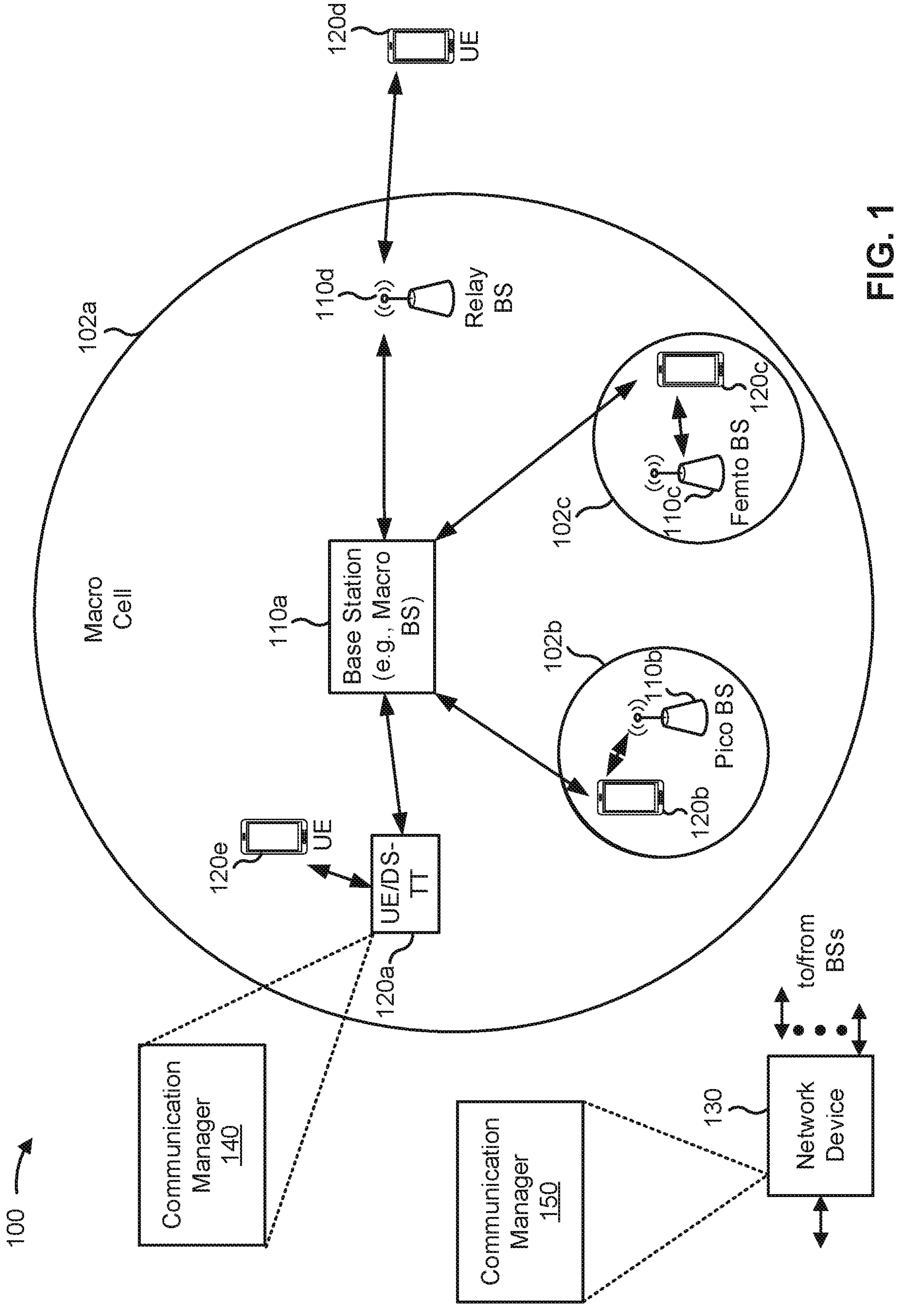
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. UE 120*a* may be or may include a wireless communication device that is associated with a device-side time sensitive networking (TSN) translator (DS-TT). A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g. 5 to 40 watts) whereas pico base stations, femto base stations, and relay base stations may have lower transmit power levels (e.g., 0.1 to 2 watts).

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

A network device 130 may be part of a core network or a logical TSN bridge for handling time-sensitive communications. The network device 130 may be a TSN application function (TSN-AF) that manages TSN functions. Alternatively, or additionally, the network device 130 may be a network-side TSN translator (NW-TT) that communicates with a DS-TT via base stations 110 and that communicates with a TSN-AF via one or more interfaces.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 G-Hz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device (e.g., UE 120) may include a communication manager 140. As described in more detail elsewhere herein, the communication manager 140 may receive, from a TSN-AF, a first request for a parameter at a DS-TT associated with the wireless communication device. The communication manager 140 may generate a cause code that indicates that the parameter is supported but not available, if the parameter is not available. The communication manager 140 may transmit the cause code to the TSN-AF. Additionally, or alternatively, the communication manager 140 may perform one or more other operations described herein.

In some aspects, a network device (e.g., network device 130) may include a communication manager 150. As described in more detail elsewhere herein, the communication manager 150 may receive, from a TSN-AF, a first request for a parameter at an NW-TT associated with the network device. The communication manager 150 may generate a cause code that indicates that the parameter is supported but not available, if the parameter is not available; and transmit the cause code to the TSN-AF. Additionally, or alternatively, the communication manager 150 may perform one or more other operations described herein.

In some aspects, a network device (e.g., network device 130) may include a communication manager 150. As described in more detail elsewhere herein, the communication manager 150 may transmit, to a DS-TT or an NW-TT, a first request for a parameter. The communication manager 150 may receive a cause code that indicates that the parameter is supported but not available. Additionally, or alternatively, the communication manager 150 may perform one or more other operations described herein.

As indicated above, FIG. 1 is provided as an example. Other examples may differ from what is described with regard to FIG. 1.

Figure 2:
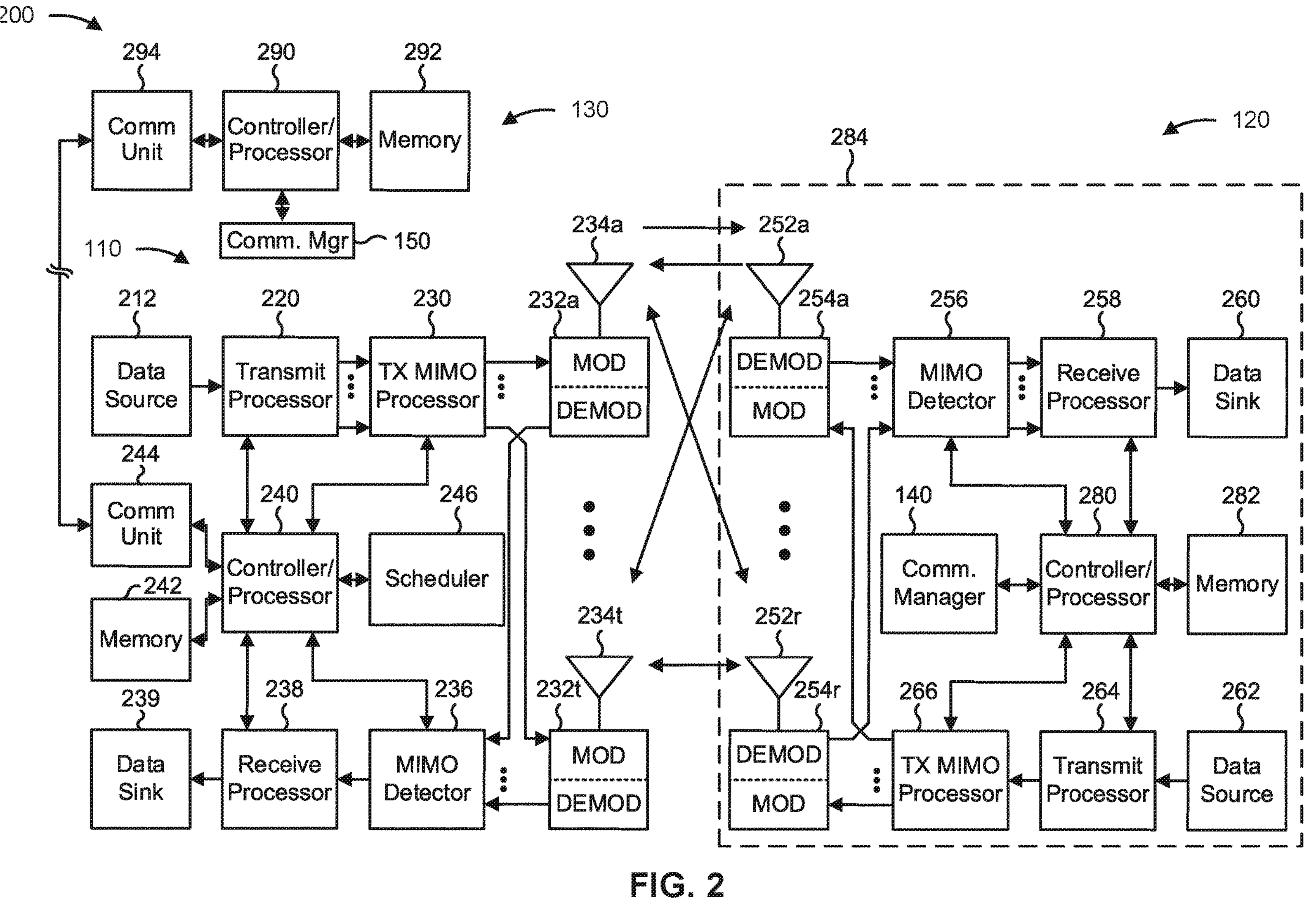
FIG. 2 is a diagram illustrating an example of a base station in communication with a user equipment (UE) in a wireless network, in accordance with the present disclosure.

FIG. 2 is a diagram illustrating an example 200 of a network device 130 (e.g., NW-TT) that is in communication with another network device 130 (e.g., TSN-AF) and/or in communication with a UE 120 (e.g., DS-TT) via base station 110 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g. T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network device 130 may include a communication unit 294, a controller/processor 290, and a memory 292. The network device 130 may include, for example, one or more devices in a core network. The network device 130 may communicate with another network device 130 or the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with a network controller. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna (s) 234, the modem(s) 232, the MTMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, the controller/processor 290 of the network device 130, and/or any other component(s) of FIG. 2 may perform one or more techniques associated with indicating that a TSN parameter is supported but not available, as described in more detail elsewhere herein. In some aspects, the TSN-AF or the NW-TT described herein is the network device 130, is included in the network device 130, or includes one or more components of the network device 130 shown in FIG. 2. In some aspects, the DS-TT described herein is in or associated with a wireless communication device, which may be the UE 120, is included in the UE 120, or includes one or more components of the UE 120 shown in FIG. 2. For example, the controller/processor 240 of the base station 110, the controller/processor 280 of the UE 120, the controller/processor 290 of the network device 130, and/or any other component(s) of FIG. 2 may perform or direct operations of, for example, process 600 of FIG. 6, process 700 of FIG. 7, process 800 of FIG. 8, and/or other processes as described herein. The memory 242, the memory 282, and the memory 292 may store data and program codes for the base station 110, the UE 120, and the network device 130, respectively. In some examples, the memory 242, the memory 282, and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the network device 130, may cause the one or more processors, the UE 120, the base station 110, or the network device 130 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the wireless communication device (e.g., UE 120) includes means for receiving, from a TSN-AF, a first request for a parameter at a DS-TT associated with the wireless communication device, means for generating a cause code that indicates that the parameter is supported but not available, if the parameter is not available, and/or means for transmitting the cause code to the TSN-AF. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network device 130 includes means for receiving, from a TSN-AF, a first request for a parameter at an NW-TT associated with the network device, means for generating a cause code that indicates that the parameter is supported but not available, if the parameter is not available, and/or means for transmitting the cause code to the TSN-AF. In some aspects, the means for the network device 130 to perform operations described herein may include, for example, one or more of communication manager 150, controller/processor 290, memory 292, and communication unit 294.

In some aspects, the network device 130 includes means for transmitting, to a DS-TT or an NW-TT, a first request for a parameter, and/or means for receiving a cause code that indicates that the parameter is supported but not available. In some aspects, the means for the network device 130 to perform operations described herein may include, for example, one or more of communication manager 150, controller/processor 290, memory 292, and communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280. The functions described with respect to the communication unit 294 may be performed by or under the control of the controller/processor 290.

As indicated above, FIG. 2 is provided as an example. Other examples may differ from what is described with regard to FIG. 2.

Figure 3:
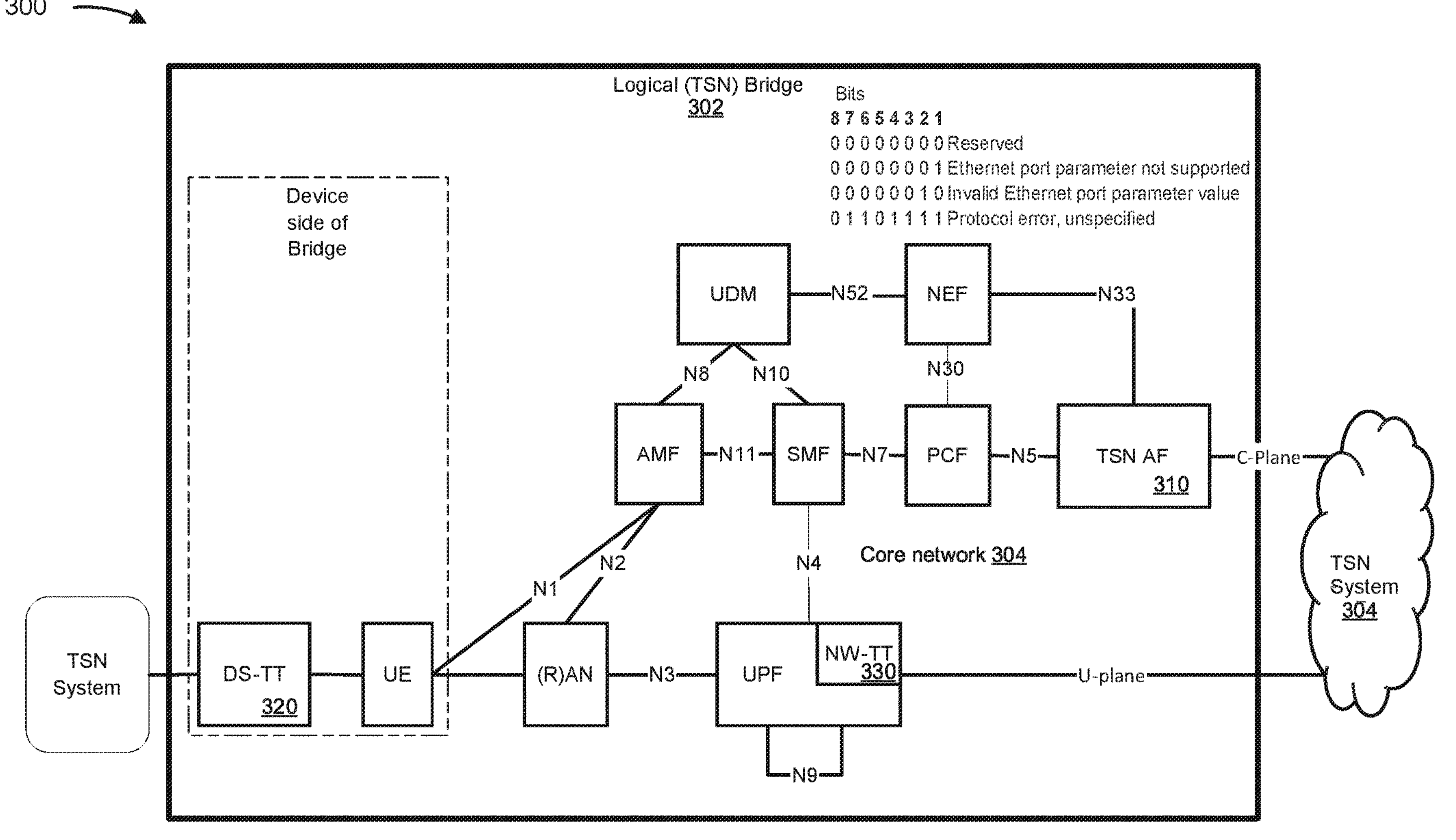
FIG. 3 is a diagram illustrating an example of a logical time sensitive networking (TSN) bridge between components of a TSN system, in accordance with the present disclosure.

FIG. 3 is a diagram illustrating an example 300 of a logical TSN bridge 302 between components of a TSN system, in accordance with the present disclosure. TSN focuses on converging information technology and industrial operational technology by extending and adapting existing Ethernet standards. A TSN system may include a TSN controller and one or more TSN components or nodes that operate according to a set of Ethernet standards defined in the Institute of Electrical and Electronics Engineers (IEEE) 802.1 TSN Task Group. These standards may be used to manage end-to-end latency for time-sensitive nodes. TSN systems may be integrated with NR networks. Example 300 shows a core NR network 304 that is part of the logical TSN bridge 302 between the components of the TSN system.

The logical TSN bridge 302 may include a TSN-AF 310 that controls the time-sensitive communications between the TSN systems. The TSN-AF 310 may be located in or may be associated with a network device, such as network device 130. The core network 304 used by the TSN logical bridge 302 may include a user plane function (UPF) that routes information between the TSN-AF 310 (on a network side of the logical TSN bridge 302) and a DS-TT 320 (on a device side of the logical TSN bridge 302). The DS-TT 320 may translate or otherwise forward information from a TSN node to the TSN system using an associated wireless communication device, such as a UE 120. The UE 120 may communicate with the core network 304 via a base station 110 of a radio access network (RAN). The UPF may include or may be associated with an NW-TT 330 that acts as a hop in the logical TSN bridge 302. In order to support the exchange of TSN bridge information between the TSN-AF 310 and the core network 304, the TSN-AF 310 may use a port management information container for transparently transferring standardized and deployment-specific port management information between the TSN-AF 310 and the DS-TT 320 and/or the NW-TT 330.

The core network 304 may include other components, such as a network exposure function (NEF) that helps other entities discover network services, a session management function (SMFs) that supports the establishment, modification, and release of communication sessions, a policy control function (PCF) that provides a policy framework, a unified data management (UDM) function that stores user data and subscriber profile information, and an access and mobility management function (AMF) that acts as a termination point for non-access stratum (NAS) signaling and/or mobility management.

The core network 304 may request Ethernet port management from the TSN-AF 310 to the DS-TT 320 and/or the NW-TT 330 using an operation code of "get capability", "read parameter", "set parameter", "subscribe-notify for parameter" or "unsubscribe for parameter". For the operation of "read parameter", the core network 304 indicates the attempt to read the value of a parameter at the DS-TT 320 or the NW-TT 330 Ethernet port. If the value of the parameter at the DS-TT 320 or the NW-TT 330 Ethernet port is read successfully, the DS-TT 320 or the NW-TT 330 may include the parameter and a current value of the parameter in an Ethernet port status information element (IE) of a MANAGE ETHERNET PORT COMPLETE message. If the value of the parameter at the DS-TT 320 or the NW-TT 330 Ethernet port was not read successfully, the DS-TT 320 or the NW-TT 330 may include the parameter and an associated Ethernet port management service cause code in the Ethernet port status IE of the MANAGE ETHERNET PORT COMPLETE message. The parameter may be associated with a transmission propagation delay (txPropagationDelay) between an Ethernet port in the DS-TT 320 and the NW-TT 330 or between the DS-TT 320 and the next hop Ethernet node that is connected to the Ethernet port. The core network 304 may also request bridge management from the TSN-AF 310 or the NW-TT 330 with an operation code of "get capability", "read parameter", "set parameter", "subscribe-notify for parameter" or "unsubscribe for parameter".

In some scenarios, port management information may be available in the DS-TT 320 or NW-TT 330 a period of time after a protocol data unit (PDU) session is activated. For example, the parameter may be a port parameter, such as parameter txPropagationDelay. and a value of the parameter txPropagationDelay may be available only after the DS-TT 320 or NW-TT 330 has started measuring the propagation delay to its next hop neighbor. The measuring may not occur until after the DS-TT 320 or NW-TT 330 has selected the next hop neighbor, which may not occur until after PDU session establishment. If the TSN-AF 310 requests a read of the parameter too early from the DS-TT 320 or the NW-TT 330, then the DS-TT 320 or the NW-TT 330 may not be able to provide a response for the parameter. As a result, the DS-TT 320 or NW-TT 330 may provide a service cause code (e.g., bits identifying an index of a cause code) that indicates that the parameter is not supported (e.g., "Ethernet port parameter not supported", "Invalid Ethernet port parameter value" or an unspecified protocol error as shown in example 300). The TSN-AF 310 may consider this service code as a permanent error and may never request the parameter again, even though the parameter may have just become available following PDU establishment. Consequently, the TSN-AF 310 may never obtain or may not timely obtain a value of the parameter (e.g., transmission propagation delay) for the DS-TT 320 or the NW-TT 330 and thus may not perform further operations with accurate information about the propagation delay associated with the DS-TT 320. This may cause communications between a TSN node and the TSN system to have extra latency, to degrade, or to otherwise not meet TSN requirements.

Similarly, in some scenarios, bridge management information (e.g., a bridge status between the DS-TT 320 and a neighbor or next hop) may be available at the NW-TT 330 a time period after PDU session activation. For example, neighbor information discovered for a port of the DS-TT 320 may be available only after the NW-TT 330 has discovered a neighbor of the port via a link-layer discovery protocol (LLDP). If the TSN-AF 310 requests the NW-TT 330 to read discovered neighbor information for DS-TT ports too early, the NW-TT 330 may not be able to provide a response. Accordingly, the NW-TT 330 may provide a cause code that indicates that the bridge parameter is not supported (e.g., "Bridge parameter not supported"), even though the bridge parameter is supported but not yet available. Once more, the TSN-AF 310 is unable to distinguish between a temporary cause for not providing a parameter value and a permanent error for a parameter.

As indicated above, FIG. 3 is provided as an example. Other examples may differ from what is described with regard to FIG. 3.

Figure 4:
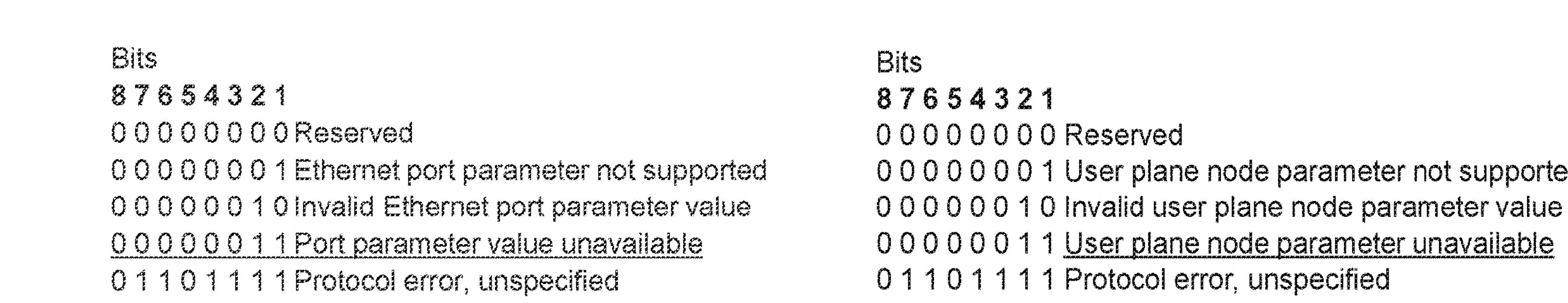
FIG. 4 is a diagram illustrating an example of indicating that a parameter is supported but not available, in accordance with the present disclosure.
Figure 4:
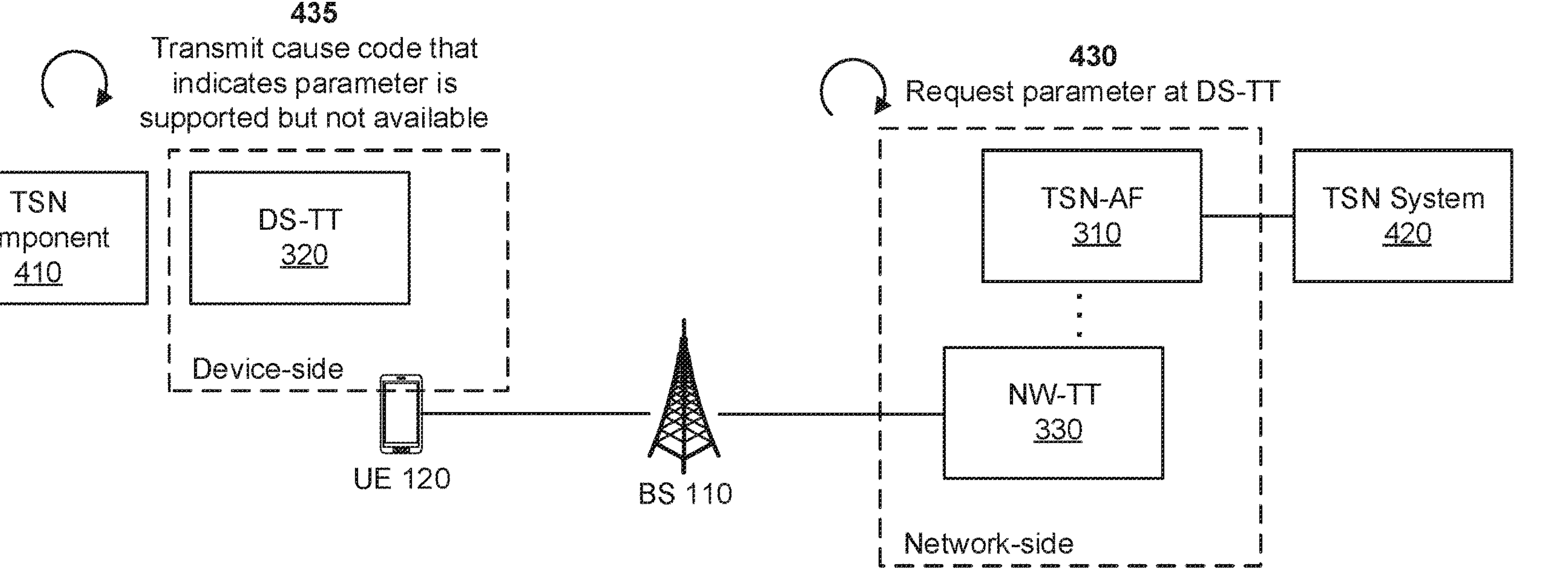

FIG. 4 is a diagram illustrating an example 400 of indicating that a parameter is supported but not available, in accordance with the present disclosure. Example 400 shows operations for a DS-TT, such as DS-TT 320 on the device-side of a TSN logical bridge. The TSN logical bridge may bridge communications between one or more TSN components 410 and a TSN system 420 that controls the TSN components 410. The DS-TT 320 may be a part of, or otherwise associated with, a UE (e.g., UE 120) that communicates with a core network via a base station (e.g., base station 110). The core network may include the NW-TT 330 (e.g., at a UPF, in a network device 130), and the NW-TT 330 may be connected to the TSN-AF 310 through one or more interfaces or network components. The TSN-AF 310 may reside in or may be associated with a network device (e.g., network device 130).

Due to the permanent nature of a reported cause code such as "Ethernet port parameter not supported", the TSN-AF 310 may not be able to distinguish between a permanent error and a temporary cause for not receiving a parameter value (parameter is supported but not yet available). According to various aspects described herein, the DS-TT 320 or the NW-TT 330 may provide a cause code to the TSN-AF 310 that indicates that the parameter is supported but not yet available. Therefore, the TSN-AF 310 does not interpret this first response as a permanent error. Accordingly, the TSN-AF 310 may later transmit a second request in which the DS-TT 320 or the NW TT 330 returns an indication of a value of the parameter. As a result, the TSN-AF 310 is able to configure the communication of TSN node information from DS-TT 320 and through NW-TT 330 with information provided for the parameter. For example, the DS-TT 320 may transmit an indication of a propagation delay or neighbor information discovered via LLDP. The TSN-AF 310 may then configure future communications of TSN information so as to reduce latency and cause the DS-TT 320 and/or the NW-TT 330 to conserve processing resources and signaling resources.

In some aspects, the TSN-AF 310 may initiate a management procedure to subscribe the TSN-AF 310 to be notified of a value of the parameter when the parameter becomes available. The subscription may also involve changes to the parameter. Alternatively, the DS-TT 320 or the NW-TT 330 may initiate a procedure to subscribe the TSN-AF 310 to be notified when the parameter becomes available, if the TSN-AF 310 does not transmit a request to subscribe to be notified.

Example 400 shows that the DS-TT 320 may be able to indicate a value of a parameter at the DS-TT 320. As shown by reference number 430, the TSN-AF 310 may transmit a request for the parameter. The parameter may be a port parameter. The port parameter may indicate a bridge status, a user plane status, or indicate neighbor information.

However, the DS-TT 320 may not have a value for the parameter. The parameter may be supported but a value may not yet be available for the parameter. As shown by reference number 435, the DS-TT 320 may transmit, to the TSN-AF 310, a cause code that indicates that the parameter is not available, in contrast to a cause code that indicates that the parameter is not supported or otherwise indicates a permanent inability to provide a value for the parameter. The cause code may be a cause code that is part of an Ethernet port management service that indicates reasons why an Ethernet port parameter is not able to be read successfully. Examples of the cause codes are shown in example 400, including a new "Port parameter value unavailable" cause code.

For 3GPP standards Release 17, if the TSN-AF 310 requested user plane node management, the TSN-AF 310 may request a user plane node parameter from either the DS-TT 320 or the NW-TT 330. The DS-TT 320 may, following such a request, provide a cause code that indicates that the user plane node parameter is supported but not available (e.g., "User plane node parameter unavailable" shown in example 400). The DS-TT 320 may provide a value of the user plane node parameter to the TSN-AF 310 when the user plane node parameter becomes available.

In some aspects, the TSN-AF 310 may subscribe (transmit a subscription request to the DS-TT 320) to be notified when the value of the port parameter or the user plane node parameter becomes available. If the TSN-AF **3*i*) does not subscribe to be notified when the value of the port parameter or the user plane node parameter becomes available (or changes), the DS-TT 320** may perform a DS-TT-initiated port management procedure to report the value of the port parameter or the user plane node parameter when the port parameter or the user plane node parameter becomes available.

As indicated above, FIG. 4 is provided as an example. Other examples may differ from what is described with regard to FIG. 4.

Figure 5:
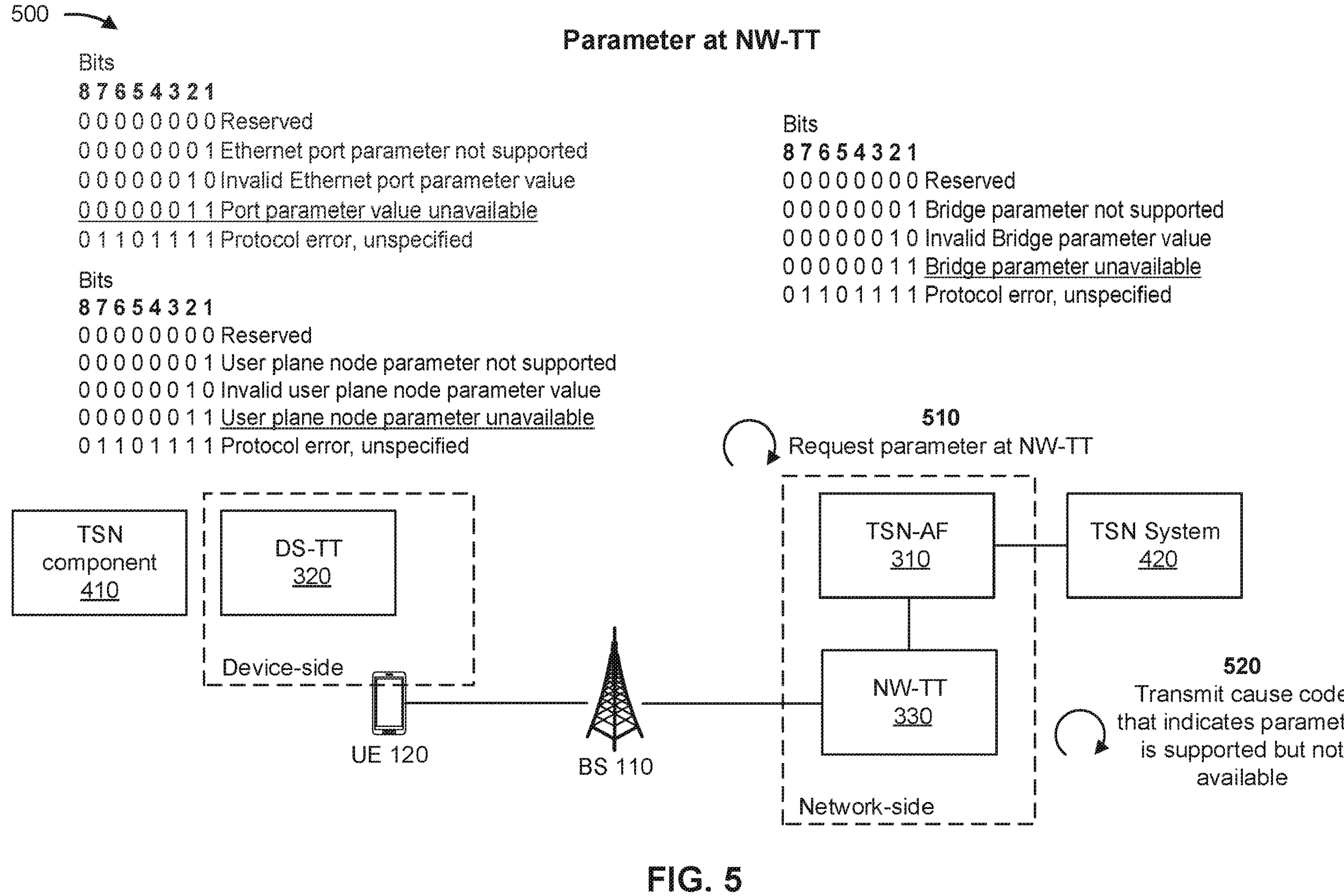
FIG. 5 is a diagram illustrating another example of indicating that a parameter is supported but not available, in accordance with the present disclosure.

FIG. 5 is a diagram illustrating another example 500 of indicating that a parameter is supported but not available, in accordance with the present disclosure. While example 400 of FIG. 4 shows operations for the DS-TT 320, example 500 shows operations for the NW-TT 330 that resides on the network side of the TSN logical bridge.

The NW-TT 330 may return a value of a port parameter. Note that a bridge parameter may be a port parameter that indicates a bridge status and is named "bridge parameter" in 3GPP standards Release 16 but named "user plane node parameter" in 3GPP Release 17 (to indicate a "user plane status" rather than a "bridge status"). In some aspects, the NW-TT 330 may, following a request by the TSN-AF 310 for a port parameter or a bridge parameter, return a cause code that indicates that the port parameter or bridge parameter is supported but not yet available.

For example, as shown by reference number 510, the TSN-AF 310 may request a parameter from the NW-TT 330. The parameter may be a port parameter associated with the DS-TT 320 or a bridge parameter (Release 16) related to neighbor information for the DS-TT 320. However, the parameter, while supported, may not be available. As shown by reference number 520, the NW-TT 330 may transmit a cause code that indicates that the parameter is not available (but still supported and a later request may retrieve a value of the parameter).

For Release 17, if the TSN-AF 310 requested user plane node management, the TSN-AF 310 may request a user plane node parameter from the NW-TT 330. The NV-TT 330 may, following such a request, provide a cause code that indicates that the user plane node parameter is supported but not available. The NW-TT 330 may provide a value of the user plane node parameter to the TSN-AF 310 when the user plane node parameter becomes available.

In some aspects, the TSN-AF 310 may subscribe (transmit a subscription request to the NW-TT 330) to be notified when the value of a parameter becomes available (or changes). If the TSN-AF 310 does not subscribe to be notified when the value of the parameter becomes available (or changes), the NW-TT 330 may perform an NW-TT-initiated management procedure to report the value of the parameter when the parameter becomes available. A port management procedure may include conditions, rules, or steps for managing a port or port information for a DS-TT 320. The port management procedure may be used for reporting port parameters. Likewise, a bridge management procedure for managing bridge information and use may be used for reporting bridge parameters, and a user plane node management procedure for user plane information (e.g., status) and use may be used for reporting user plane node parameters.

By informing the TSN-AF 310 that a parameter is supported but not available, the TSN-AF 310 may not treat a temporary status as a permanent condition. As a result, the TSN-AF 310 may eventually obtain parameter information to assist with configuring TSN communications for a TSN system.

As indicated above, FIG. 5 is provided as an example. Other examples may differ from what is described with regard to FIG. 5.

Figure 6:
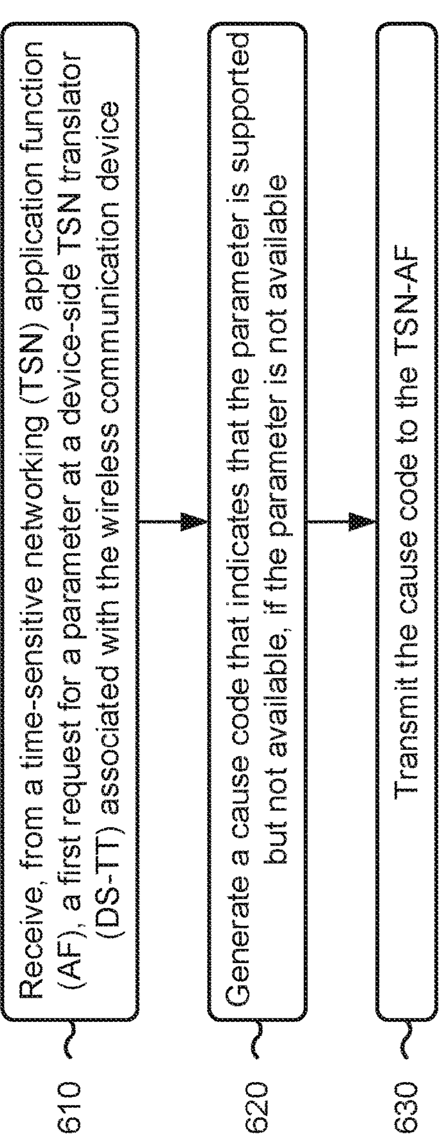
FIG. 6 is a diagram illustrating an example process performed, for example, by a wireless communication device, in accordance with the present disclosure.

FIG. 6 is a diagram illustrating an example process 600 performed, for example, by a wireless communication device, in accordance with the present disclosure. Example process 600 is an example where the wireless communication device (e.g., UE 120) performs operations associated with indicating that a TSN parameter is supported but not available.

As shown in FIG. 6, in some aspects, process 600 may include receiving, from a TSN-AF, a first request for a parameter at a DS-TT associated with the wireless communication device (block 610). For example, the wireless communication device (e.g., using communication manager 140 and/or reception component 902 depicted in FIG. 9) may receive, from a TSN-AF, a first request for a parameter at a DS-TT associated with the wireless communication device, as described above.

As further shown in FIG. 6, in some aspects, process 600 may include generating a cause code that indicates that the parameter is supported but not available, if the parameter is not available (block 620). For example, the wireless communication device (e.g., using communication manager 140 and/or generation component 908 depicted in FIG. 9) may generate a cause code that indicates that the parameter is supported but not available, if the parameter is not available, as described above.

As further shown in FIG. 6, in some aspects, process 600 may include transmitting the cause code to the TSN-AF (block 630). For example, the wireless communication device (e.g., using communication manager 140 and/or transmission component 904 depicted in FIG. 9) may transmit the cause code to the TSN-AF, as described above.

Process 600 may include additional aspects, such as any single aspect or any combination of aspects described below and/or in connection with one or more other processes described elsewhere herein.

In a first aspect, the parameter is a port parameter.

In a second aspect, alone or in combination with the first aspect, transmitting the cause code includes transmitting a port parameter unavailable cause code in a manage Ethernet port complete message.

In a third aspect, alone or in combination with one or more of the first and second aspects, process 600 includes initiating a port management procedure to report a value of the port parameter when the port parameter becomes available at the DS-TT, if the DS-TT does not receive a message from the TSN-AF that subscribes the TSN-AF to be notified when the port parameter becomes available.

In a fourth aspect, alone or in combination with one or more of the first through third aspects, process 600 includes transmitting an indication of a value of the parameter if the parameter becomes available after transmitting the cause code.

In a fifth aspect, alone or in combination with one or more of the first through fourth aspects, transmitting the indication includes transmitting the indication in response to a second request for the parameter.

In a sixth aspect, alone or in combination with one or more of the first through fifth aspects, the port parameter indicates a user plane status at the DS-TT.

In a seventh aspect, alone or in combination with one or more of the first through sixth aspects, transmitting the cause code includes transmitting a user plane node parameter unavailable cause code in a manage user plane node complete message.

In an eighth aspect, alone or in combination with one or more of the first through seventh aspects, process 600 includes initiating a user plane node management procedure to report a value of the port parameter when the port parameter becomes available at the DS-TT, if the DS-TT does not receive a message from the TSN-AF that subscribes the TSN-AF to be notified when the port parameter becomes available.

In a ninth aspect, alone or in combination with one or more of the first through eighth aspects, the parameter is associated with a transmission propagation delay or neighbor information discovered via an LLDP.

In a tenth aspect, alone or in combination with one or more of the first through ninth aspects, process 600 includes subscribing the TSN-AF to be notified when the parameter becomes available after receiving a request to subscribe the TSN-AF.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
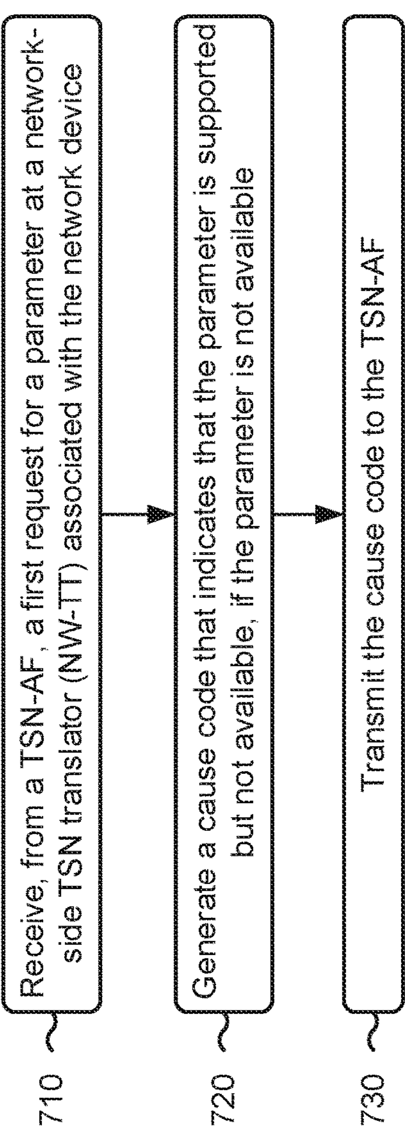
FIG. 7 is a diagram illustrating an example process performed, for example, by a network device, in accordance with the present disclosure.

FIG. 7 is a diagram illustrating an example process 700 performed, for example, by a network device, in accordance with the present disclosure. Example process 700 is an example where the network device (e.g., network device 130) performs operations associated with indicating that a TSN parameter is supported but not available.

As shown in FIG. 7, in some aspects, process 700 may include receiving, from a TSN-AF, a first request for a parameter at an NW-TT associated with the network device (block 710). For example, the network device (e.g., using communication manager 150 and/or reception component 1002 depicted in FIG. 10) may receive, from a TSN-AF, a first request for a parameter at an NW-TT associated with the network device, as described above.

As further shown in FIG. 7, in some aspects, process 700 may include generating a cause code that indicates that the parameter is supported but not available, if the parameter is not available (block 720). For example, the network device (e.g., using communication manager 150 and/or generation component 1008 depicted in FIG. 10) may generate a cause code that indicates that the parameter is supported but not available, if the parameter is not available, as described above.

As further shown in FIG. 7, in some aspects, process 700 may include transmitting the cause code to the TSN-AF (block 730). For example, the network device (e.g., using communication manager 150 and/or transmission component 1004 depicted in FIG. 10) may transmit the cause code to the TSN-AF, as described above.

Process 700 may include additional aspects, such as any single aspect or any combination of aspects described below and/or in connection with one or more other processes described elsewhere herein.

In a first aspect, the parameter is a port parameter.

In a second aspect, alone or in combination with the first aspect, transmitting the cause code includes transmitting a port parameter unavailable cause code in a manage Ethernet port complete message.

In a third aspect, alone or in combination with one or more of the first and second aspects, process 700 includes initiating a port management procedure to report a value of the port parameter when the port parameter becomes available at the NW-TT, if the NW-TT does not receive a message from the TSN-AF to subscribe the TSN-AF to be notified when the port parameter becomes available.

In a fourth aspect, alone or in combination with one or more of the first through third aspects, process 700 includes transmitting an indication of a value of the parameter if the parameter becomes available after transmitting the cause code.

In a fifth aspect, alone or in combination with one or more of the first through fourth aspects, transmitting the indication includes transmitting the indication in response to a second request for the parameter.

In a sixth aspect, alone or in combination with one or more of the first through fifth aspects, the port parameter indicates a bridge status at the NW-TT.

In a seventh aspect, alone or in combination with one or more of the first through sixth aspects, transmitting the cause code includes transmitting a bridge parameter unavailable cause code in a manage bridge complete message.

In an eighth aspect, alone or in combination with one or more of the first through seventh aspects, process 700 includes initiating a bridge management procedure to report a value of the port parameter when the port parameter becomes available at the NW-TT, if the NW-TT does not receive a message from the TSN-AF that subscribes the TSN-AF to be notified when the value of the port parameter becomes available.

In a ninth aspect, alone or in combination with one or more of the first through eighth aspects, the port parameter indicates a user plane status at the NW-TT.

In a tenth aspect, alone or in combination with one or more of the first through ninth aspects, transmitting the cause code includes transmitting a user plane node parameter unavailable cause code in a manage user plane node complete message.

In an eleventh aspect, alone or in combination with one or more of the first through tenth aspects, process 700 includes initiating a user plane node management procedure to report a value of the port parameter when the port parameter becomes available at the NW-TT, if the NW-TT does not receive a message from the TSN-AF that subscribes the TSN-AF to be notified when the port parameter becomes available.

In a twelfth aspect, alone or in combination with one or more of the first through eleventh aspects, the parameter is associated with a transmission propagation delay or neighbor information discovered via an LLDP.

In a thirteenth aspect, alone or in combination with one or more of the first through twelfth aspects, process 700 includes subscribing the TSN-AF to be notified when the parameter becomes available after receiving a request to subscribe the TSN-AF.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
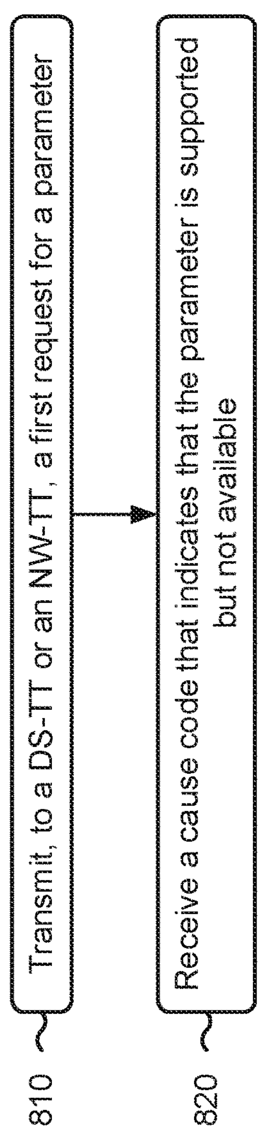
FIG. 8 is a diagram illustrating an example process performed, for example, by a network device, in accordance with the present disclosure.

FIG. 8 is a diagram illustrating an example process 800 performed, for example, by a network device, in accordance with the present disclosure. Example process 800 is an example where the network device (e.g., network device 130) performs operations associated with requesting a TSN parameter.

As shown in FIG. 8, in some aspects, process 800 may include transmitting, to a DS-TT or a NW-TT, a first request for a parameter (block 810). For example, the network device (e.g., using communication manager 150 and/or transmission component 1104 depicted in FIG. 11) may transmit, to a DS-TT or a NW-TT, a first request for a parameter, as described above.

As further shown in FIG. 8, in some aspects, process 800 may include receiving a cause code that indicates that the parameter is supported but not available (block 820). For example, the network device (e.g., using communication manager 150 and/or reception component 1102 depicted in FIG. 11) may receive a cause code that indicates that the parameter is supported but not available, as described above.

Process 800 may include additional aspects, such as any single aspect or any combination of aspects described below and/or in connection with one or more other processes described elsewhere herein.

In a first aspect, the parameter is a port parameter at the DS-TT or the NW-TT.

In a second aspect, alone or in combination with the first aspect, the parameter is a bridge parameter at the NW-TT.

In a third aspect, alone or in combination with one or more of the first and second aspects, the parameter is a user plane node parameter at the DS-TT or the NW-TT.

In a fourth aspect, alone or in combination with one or more of the first through third aspects, process 800 includes initiating a management procedure that subscribes the TSN-AF to be notified if the parameter becomes available at the DS-TT or the NW-TT and receiving an indication of a value of the parameter.

In a fifth aspect, alone or in combination with one or more of the first through fourth aspects, process 800 includes transmitting a second request based at least in part on receiving the cause code and receiving an indication of a value of the parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
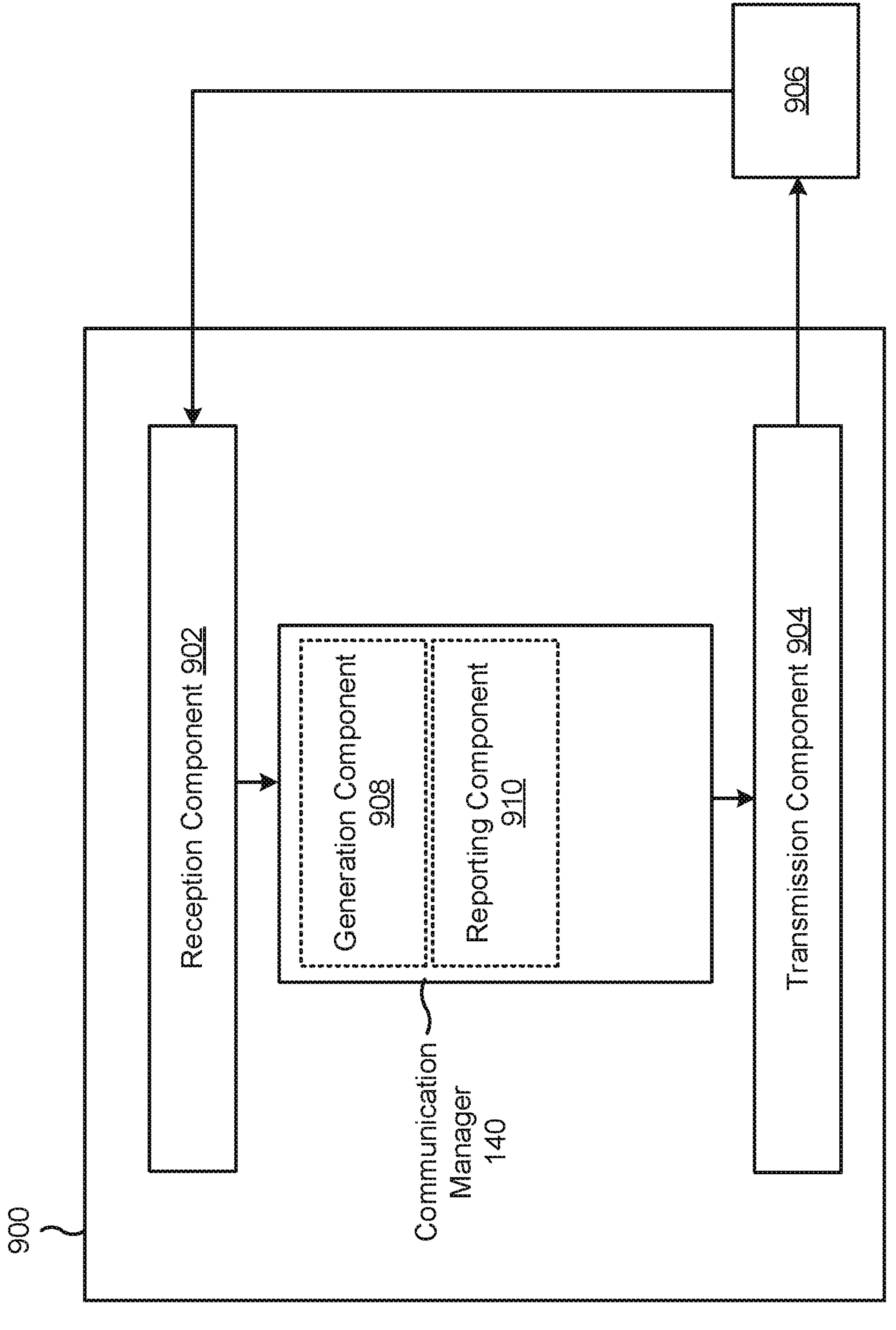
FIGS. 9-11 are diagrams of example apparatuses for wireless communication, in accordance with the present disclosure.

FIG. 9 is a diagram of an example apparatus 900 for wireless communication. The apparatus 900 may be a wireless communication device (e.g., UE 120), or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a generation component 908 and/or a reporting component 910, among other examples.

In some aspects, the apparatus 900 may be configured to perform one or more operations described herein in connection with FIGS. 1-5. Additionally, or alternatively, the apparatus 900 may be configured to perform one or more processes described herein, such as process 600 of FIG. 6. In some aspects, the apparatus 900 and/or one or more components shown in FIG. 9 may include one or more components of the wireless communication device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MTMO detector, a receive processor, a controller/processor, a memory, or a combination thereof, of the wireless communication device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the wireless communication device described in connection with FIG. 2. In some aspects, the transmission component 904 may be co-located with the reception component 902 in a transceiver.

The reception component 902 may receive, from a TSN-AF, a first request for a parameter at a DS-TT associated with the wireless communication device. The generation component 908 may generate a cause code that indicates that the parameter is supported but not available, if the parameter is not available. The transmission component 904 may transmit the cause code to the TSN-AF.

The reporting component 910 may initiate a port management procedure to report a value of the port parameter when the port parameter becomes available at the DS-TT, if the DS-TT does not receive a message from the TSN-AF that subscribes the TSN-AF to be notified when the port parameter becomes available.

The transmission component 904 may transmit an indication of a value of the parameter if the parameter becomes available after transmitting the cause code. The reporting component 910 may initiate a user plane node management procedure to report a value of the port parameter when the port parameter becomes available at the DS-TT, if the DS-TT does not receive a message from the TSN-AF that subscribes the TSN-AF to be notified when the port parameter becomes available.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
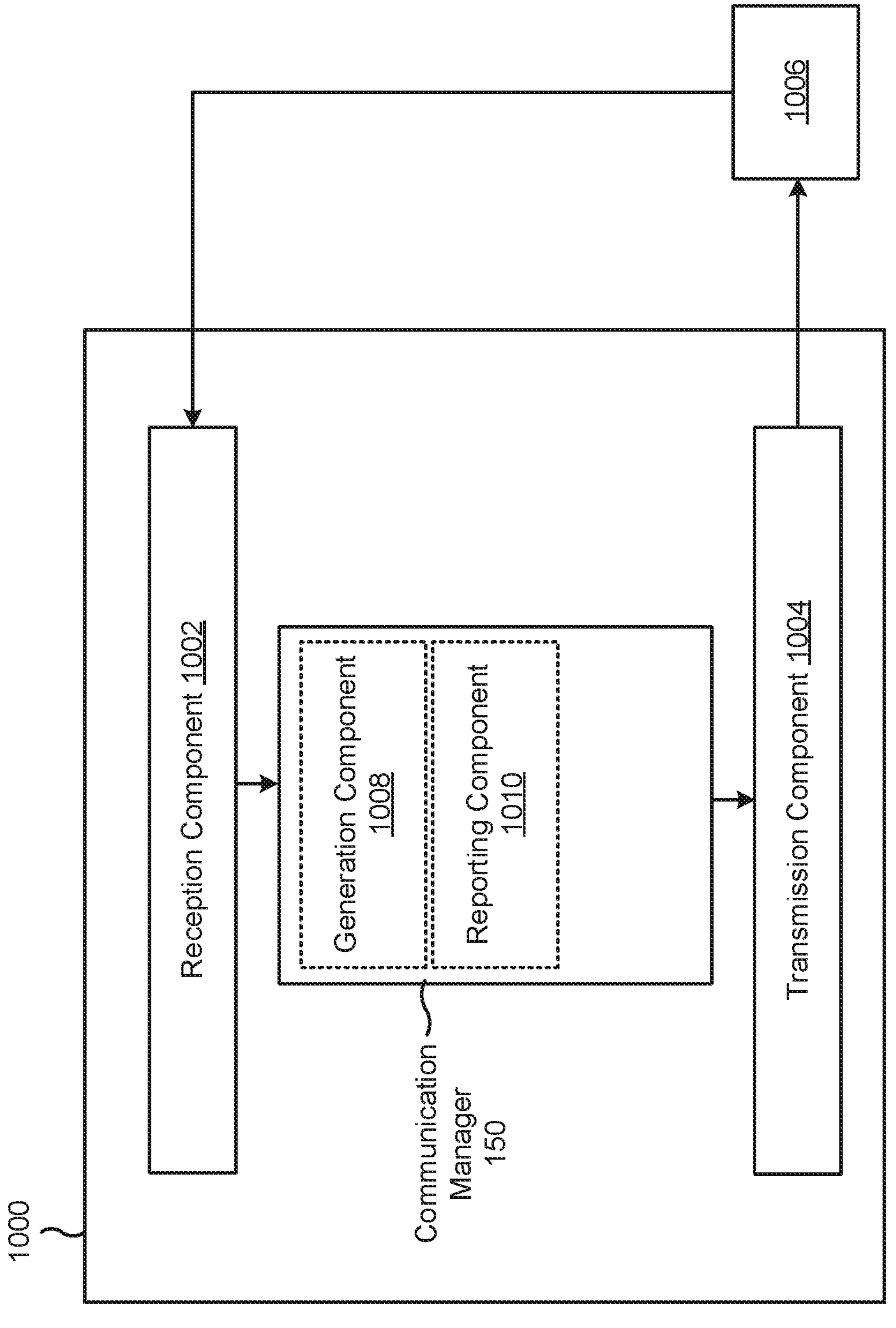

FIG. 10 is a diagram of an example apparatus 1000 for wireless communication. The apparatus 1000 may be a network device (e.g., network device 130), or a network device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a generation component 1008 and/or a reporting component 1010, among other examples.

In some aspects, the apparatus 1000 may be configured to perform one or more operations described herein in connection with FIGS. 1-5. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the network device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the network device described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network device described in connection with FIG. 2. In some aspects, the transmission component 1004 may be co-located with the reception component 1002 in a transceiver.

The reception component 1002 may receive, from a TSN-AF, a first request for a parameter at an NW-TT associated with the network device. The generation component 1008 may generate a cause code that indicates that the parameter is supported but not available, if the parameter is not available. The transmission component 1004 may transmit the cause code to the TSN-AF.

The reporting component 1010 may initiate a port management procedure to report a value of the port parameter when the port parameter becomes available at the NW-TT, if the NW-TT does not receive a message from the TSN-AF to subscribe the TSN-AF to be notified when the port parameter becomes available. The transmission component 1004 may transmit an indication of a value of the parameter if the parameter becomes available after transmitting the cause code. The reporting component 1010 may initiate a bridge management procedure to report a value of the port parameter when the port parameter becomes available at the NW-TT, if the NW-TT does not receive a message from the TSN-AF that subscribes the TSN-AF to be notified when the value of the port parameter becomes available. The reporting component 1010 may initiate a user plane node management procedure to report a value of the port parameter when the port parameter becomes available at the NW-TT, if the NW-TT does not receive a message from the TSN-AF that subscribes the TSN-AF to be notified when the port parameter becomes available.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
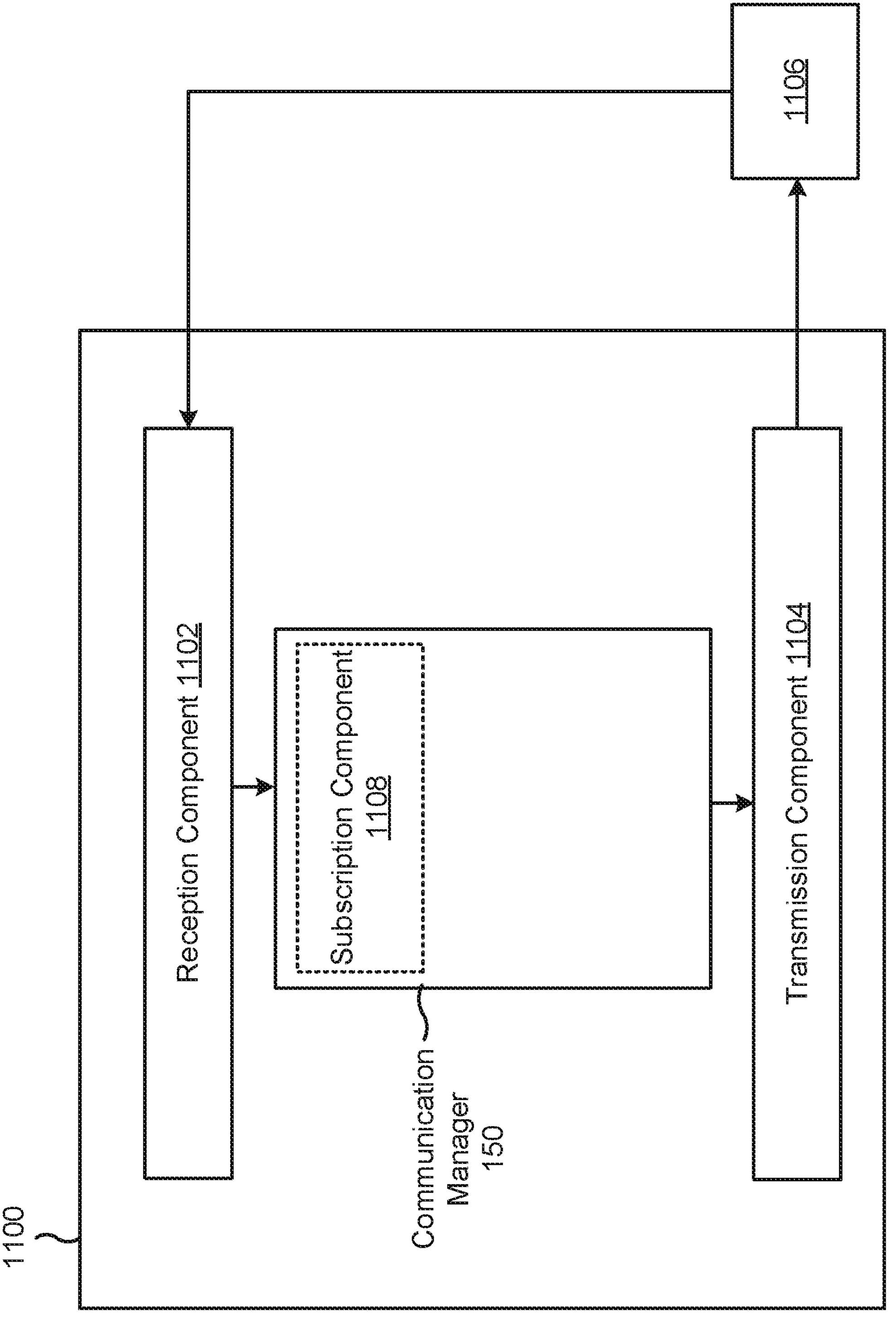

FIG. 11 is a diagram of an example apparatus 1100 for wireless communication. The apparatus 1100 may be a network device (e.g., network device 130), or a network device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a subscription component 1108, among other examples.

In some aspects, the apparatus 1100 may be configured to perform one or more operations described herein in connection with FIGS. 1-5. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the network device described in connection with FIG. 2. Additionally, or alternatively, one or more components shown in FIG. 1l may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the network device described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network device described in connection with FIG. 2. In some aspects, the transmission component 1104 may be co-located with the reception component 1102 in a transceiver.

The transmission component 1104 may transmit, to a DS-TT or a NW-TT, a first request for a parameter. The reception component 1102 may receive a cause code that indicates that the parameter is supported but not available.

The subscription component 1108 may initiate a management procedure that subscribes the TSN-AF to be notified if the parameter becomes available at the DS-TT or the NW-TT. The reception component 1102 may receive an indication of a value of the parameter.

The transmission component 1104 may transmit a second request based at least in part on receiving the cause code. The reception component 1102 may receive an indication of a value of the parameter.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless communication device, comprising: receiving, from a time-sensitive networking (TSN) application function (AF), a first request for a parameter at a device-side TSN translator (DS-TT) associated with the wireless communication device; generating a cause code that indicates that the parameter is supported but not available, if the parameter is not available; and transmitting the cause code to the TSN-AF.

Aspect 2: The method of Aspect 1, wherein the parameter is a port parameter.

Aspect 3: The method of Aspect 2, wherein transmitting the cause code includes transmitting a port parameter unavailable cause code in a manage Ethernet port complete message.

Aspect 4: The method of Aspect 2 or 3, further comprising initiating a port management procedure to report a value of the port parameter when the port parameter becomes available at the DS-TT, if the DS-TT does not receive a message from the TSN-AF that subscribes the TSN-AF to be notified when the port parameter becomes available.

Aspect 5: The method of Aspect 2, wherein the port parameter indicates a user plane status at the DS-TT.

Aspect 6: The method of Aspect 5, wherein transmitting the cause code includes transmitting a user plane node parameter unavailable cause code in a manage user plane node complete message.

Aspect 7: The method of Aspect 5 or 6, further comprising initiating a user plane node management procedure to report a value of the port parameter when the port parameter becomes available at the DS-TT, if the DS-TT does not receive a message from the TSN-AF that subscribes the TSN-AF to be notified when the port parameter becomes available.

Aspect 8: The method of any of Aspects 1-7, further comprising subscribing the TSN-AF to be notified when the parameter becomes available after receiving a request to subscribe the TSN-AF.

Aspect 9: The method ofany of Aspects 1-8, further comprising transmitting an indication of a value of the parameter if the parameter becomes available after transmitting the cause code.

Aspect 10: The method of Aspect 9, wherein transmitting the indication includes transmitting the indication in response to a second request for the parameter.

Aspect 11: The method of any of Aspects 1-10, wherein the parameter is associated with a transmission propagation delay or neighbor information discovered via a link layer discovery protocol (LLDP).

Aspect 12: A method of wireless communication performed by a network device, comprising: receiving, from a time-sensitive networking (TSN) application function (AF), a first request for a parameter at a network-side TSN translator (NW-TT) associated with the network device; generating a cause code that indicates that the parameter is supported but not available, if the parameter is not available; and transmitting the cause code to the TSN-AF.

Aspect 13: The method of Aspect 12, wherein the parameter is a port parameter.

Aspect 14: The method of Aspect 13, wherein transmitting the cause code includes transmitting a port parameter unavailable cause code in a manage Ethernet port complete message.

Aspect 15: The method of Aspect 13 or 14, further comprising initiating a port management procedure to report a value of the port parameter when the port parameter becomes available at the NW-TT, if the NW-TT does not receive a message from the TSN-AF to subscribe the TSN-AF to be notified when the port parameter becomes available.

Aspect 16: The method of Aspect 13, wherein the port parameter indicates a bridge status at the NW-TT.

Aspect 17: The method of Aspect 16, wherein transmitting the cause code includes transmitting a bridge parameter unavailable cause code in a manage bridge complete message.

Aspect 18: The method of Aspect 16 or 17, further comprising initiating a bridge management procedure to report a value of the port parameter when the port parameter becomes available at the NW-TT, if the NW-TT does not receive a message from the TSN-AF that subscribes the TSN-AF to be notified when the value of the port parameter becomes available.

Aspect 19: The method of Aspect 13, wherein the port parameter indicates a user plane status at the NW-TT.

Aspect 20: The method of Aspect 19, wherein transmitting the cause code includes transmitting a user plane node parameter unavailable cause code in a manage user plane node complete message.

Aspect 21: The method of Aspect 19 or 20, further comprising initiating a user plane node management procedure to report a value of the port parameter when the port parameter becomes available at the NW-TT, if the NW-TT does not receive a message from the TSN-AF that subscribes the TSN-AF to be notified when the port parameter becomes available.

Aspect 22: The method of any of Aspects 12-21, further comprising subscribing the TSN-AF to be notified when the parameter becomes available after receiving a request to subscribe the TSN-AF.

Aspect 23: The method of any of Aspects 12-22, further comprising transmitting an indication of a value of the parameter if the parameter becomes available after transmitting the cause code.

Aspect 24: The method of Aspect 23, wherein transmitting the indication includes transmitting the indication in response to a second request for the parameter.

Aspect 25: The method of any of Aspects 12-24, wherein the parameter is associated with a transmission propagation delay or neighbor information discovered via a link layer discovery protocol (LLDP).

Aspect 26: A method of wireless communication performed by a network device, comprising: transmitting, to a device-side time-sensitive networking (TSN) translator (DS-TT) or a network-side TSN translator (NW-TT), a first request for a parameter; and receiving a cause code that indicates that the parameter is supported but not available.

Aspect 27: The method of Aspect 26, wherein the parameter is a port parameter at the DS-TT or the NW I-TT.

Aspect 28: The method of Aspect 26, wherein the parameter is abridge parameter at the NW-TT.

Aspect 29: The method of Aspect 26, wherein the parameter is a user plane node parameter at the DS-TT or the NW-TT.

Aspect 30: The method of any of Aspects 26-29, further comprising: initiating a management procedure that subscribes the TSN-AF to be notified if the parameter becomes available at the DS-TT or the NW-TT; and receiving an indication of a value of the parameter.

Aspect 31: The method of any of Aspects 26-30, further comprising: transmitting a second request based at least in part on receiving the cause code; and receiving an indication of a value of the parameter.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b b+b+b, b+b+c, +c, and c+c+c, or any other ordering of a, b, and c).

No element, act, or instruction used herein should be construed as critical or essential unless explicitly described as such. Also, as used herein, the articles "a" and an are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have" "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:

one or more memories; and one or more processors, coupled to the one or more memories, configured to:

receive, from a time-sensitive networking (TSN) application function (AF), a first request for a parameter at a device-side TSN translator (DS-TT) associated with the wireless communication device, wherein the parameter is a port parameter;

generate a cause code that indicates that the parameter is supported but not available, if the parameter is not available;

transmit the cause code to the TSN-AF; and initiate a port management procedure to report a value of the port parameter when the port parameter becomes available at the DS-TT, if the DS-TT does not receive a message from the TSN-AF that subscribes the TSN-AF to be notified when the port parameter becomes available.

2. The wireless communication device of claim 1, wherein the one or more processors, to transmit the cause code, are configured to transmit a port parameter unavailable cause code in a manage Ethernet port complete message.

3. The wireless communication device of claim 1, wherein the port parameter indicates a user plane status at the DS-TT.

4. The wireless communication device of claim 3, wherein the one or more processors, to transmit the cause code, are configured to transmit a user plane node parameter unavailable cause code in a manage user plane node complete message.

5. The wireless communication device of claim 3, wherein the one or more processors are configured to initiate a user plane node management procedure to report a value of the port parameter when the port parameter becomes available at the DS-TT, if the DS-TT does not receive a message from the TSN-AF that subscribes the TSN-AF to be notified when the port parameter becomes available.

6. The wireless communication device of claim 1, wherein the one or more processors are configured to subscribe the TSN-AF to be notified when the parameter becomes available after receiving a request to subscribe the TSN-AF.

7. The wireless communication device of claim 1, wherein the one or more processors are configured to transmit an indication of a value of the parameter if the parameter becomes available after transmitting the cause code.

8. The wireless communication device of claim 7, wherein the one or more processors, to transmit the indication, are configured to transmit the indication in response to a second request for the parameter.

9. The wireless communication device of claim 1, wherein the parameter is associated with a transmission propagation delay or neighbor information discovered via a link layer discovery protocol (LLDP).

10. A network device for wireless communication, comprising:

one or more memories; and one or more processors, coupled to the one or more memories, configured to:

receive, from a time-sensitive networking (TSN) application function (AF), a first request for a parameter at a network-side TSN translator (NW-TT) associated with the network device, wherein the parameter is a port parameter;

generate a cause code that indicates that the parameter is supported but not available, if the parameter is not available;

transmit the cause code to the TSN-AF; and initiate a port management procedure to report a value of the port parameter when the port parameter becomes available at the NW-TT, if the NW-TT does not receive a message from the TSN-AF to subscribe the TSN-AF to be notified when the port parameter becomes available.

11. The network device of claim 10, wherein the one or more processors, to transmit the cause code, are configured to transmit a port parameter unavailable cause code in a manage Ethernet port complete message.

12. The network device of claim 10, wherein the port parameter indicates a bridge status at the NW-TT.

13. The network device of claim 12, wherein the one or more processors, to transmit the cause code, are configured to transmit a bridge parameter unavailable cause code in a manage bridge complete message.

14. The network device of claim 12, wherein the one or more processors are configured to initiate a bridge management procedure to report a value of the port parameter when the port parameter becomes available at the NW-TT, if the NW-TT does not receive a message from the TSN-AF that subscribes the TSN-AF to be notified when the value of the port parameter becomes available.

15. The network device of claim 10, wherein the port parameter indicates a user plane status at the NW-TT.

16. The network device of claim 15, wherein the one or more processors, to transmit the cause code, are configured to transmit a user plane node parameter unavailable cause code in a manage user plane node complete message.

17. The network device of claim 15, wherein the one or more processors are configured to initiate a user plane node management procedure to report a value of the port parameter when the port parameter becomes available at the NW-TT, if the NW-TT does not receive a message from the TSN-AF that subscribes the TSN-AF to be notified when the port parameter becomes available.

18. The network device of claim 10, wherein the one or more processors are configured to subscribe the TSN-AF to be notified when the parameter becomes available after receiving a request to subscribe the TSN-AF.

19. The network device of claim 10, wherein the one or more processors are configured to transmit an indication of a value of the parameter if the parameter becomes available after transmitting the cause code.

20. The network device of claim 19, wherein the one or more processors, to transmit the indication, are configured to transmit the indication in response to a second request for the parameter.

21. The network device of claim 10, wherein the parameter is associated with a transmission propagation delay or neighbor information discovered via a link layer discovery protocol (LLDP).

22. A network device for wireless communication, comprising:

one or more memories; and one or more processors, coupled to the one or more memories, configured to:

transmit, to a device-side time-sensitive networking (TSN) translator (DS-TT) or a network-side TSN translator (NW-TT), a first request for a parameter, wherein the parameter is a port parameter at the DS-TT or the NW-TT;

receive a cause code that indicates that the parameter is supported but not available; and initiate a port management procedure to report a value of the port parameter when the port parameter becomes available at the DS-TT or the NW-TT, if the DS-TT or the NW-TT does not receive a message from a time-sensitive networking (TSN) application function (AF) to subscribe the TSN-AF to be notified when the port parameter becomes available.

23. The network device of claim 22, wherein the parameter is a bridge parameter at the NW-TT.

24. The network device of claim 22, wherein the parameter is a user plane node parameter at the DS-TT or the NW-TT.

25. The network device of claim 22, wherein the one or more processors are configured to:

initiate a management procedure that subscribes the TSN-AF to be notified if the parameter becomes available at the DS-TT or the NW-TT; and receive an indication of a value of the parameter.

26. The network device of claim 22, wherein the one or more processors are configured to:

transmit a second request based at least in part on receiving the cause code; and receive an indication of a value of the parameter.

27. The network device of claim 22, wherein the one or more processors are configured to receive an indication of a value of the parameter if the parameter becomes available after receiving the cause code.

28. The network device of claim 22, wherein the port parameter indicates a user plane status at the DS-TT.

29. The network device of claim 22, wherein the one or more processors, to receive the cause code, are configured to receive a user plane node parameter unavailable cause code in a manage user plane node complete message.

30. The network device of claim 22, wherein the parameter is associated with a transmission propagation delay or neighbor information discovered via a link layer discovery protocol (LLDP).

* * * * *